Nov. 26, 1968  G. P. KLEIN  3,412,444
METHOD FOR MAKING CAPACITOR HAVING POROUS ELECTRODE
OF SINTERED POWDER ON FOIL

Filed May 2, 1966  3 Sheets-Sheet 1

INVENTOR
GERHART P. KLEIN
BY
*Robert Lewis*
ATTORNEY

Nov. 26, 1968  G. P. KLEIN  3,412,444
METHOD FOR MAKING CAPACITOR HAVING POROUS ELECTRODE
OF SINTERED POWDER ON FOIL

Filed May 2, 1966  3 Sheets-Sheet 2

INVENTOR
GERHART P. KLEIN
BY
ATTORNEY

United States Patent Office 3,412,444
Patented Nov. 26, 1968

3,412,444
METHOD FOR MAKING CAPACITOR HAVING POROUS ELECTRODE OF SINTERED POWDER ON FOIL
Gerhart P. Klein, Manchester, Mass., assignor to P. R. Mallory & Co. Inc., Indianapolis, Ind., a corporation of Delaware
Filed May 2, 1966, Ser. No. 546,714
14 Claims. (Cl. 29—25.41)

ABSTRACT OF THE DISCLOSURE

A method for fabricating structures suitable for use as anodes for capacitors. Moistened powder is deposited on each of film-forming metal appendages which extend from and are integral with a film-forming metal strip. The powder is fused to the appendages at a temperature below the sintering temperature of the film-forming metal thereby providing a porous mass of the powder bonded to each of the appendages. The porous mass and the appendages are thereafter sintered to provide capacitor anodes.

---

The present invention relates to electrolytic capacitors and more particularly relates to novel solid electrolytic capacitors.

It is well known that solid electrolytic capacitors may be manufactured by the following method: A sintered porous slug of a valve metal such as tantalum, zirconium, aluminum, niobium, and titanium is anodized in an electrolyte to form an oxide layer on the surfaces of the slug. The oxide layer serves as a dielectric for the capacitor. A semiconductor coating is applied over the oxide layer and an electrically conducting material, such as graphite and silver paint, is applied to the semiconductor layer. The semiconductor coating and electrically conducting coating serves as a cathode and the original metallic slug serves as an anode. After connecting leads to the base metal (anode) and to the conducting coating (cathode), the solid electrolytic capacitor is sealed in a metal case or is molded with a plastic resin.

As a specific example of the above established general process, assume that the basic slug is a porous tantalum slug obtained by pressing and sintering tantalum powder. The tantalum slug is then anodized in an electrolyte such as phosphoric acid to form an oxide (dielectric) layer on the surfaces thereof. A film of semiconductor material, such as manganese dioxide, is closely attached to the oxide layer by dipping the anodized slugs in an aqueous solution of manganese nitrate and converting the manganese nitrate to manganese dioxide by pyrolysis. The manganese dioxide layer is then coated with a conducting layer such as graphite and silver.

It is also known that solid electrolytic capacitors can be formed by depositing a metallic powder on a foil of the same material and sintering the powder to form a solid pellet bonded to the foil. The foil and pellet are then anodized to form a dielectric layer and a semiconductor coating and conducting coating are added as previously described to form a cathode. The foil and the pellet serve as an anode for the capacitor.

The powder on foil approach to capacitor manufacturing was conceived to eliminate handling problems for small solid electrolytic capacitors. The handling of powder on foil capacitors is significantly reduced as compared to the handling involved in the use of sintered slugs. It has also been found that elimination of the pressing operation and the binder previously associated with sintering significantly improves the quality of solid electrolytic capacitors. These capacitors can be operated safely and reliably at a higher percentage of the formation voltage of the oxide film than capacitors made according to the aforementioned "sintered slug procedures."

Powder on foil capacitors have previously been made by dispensing metallic powder droplets in a carrier liquid onto a film-forming metal provided with depressions or indentations for containing the metallic powder. As stated previously, the metallic powder and film-forming metal (foil) must be of the same material. The foil containing a plurality of individual powder droplets is processed as a whole and the completed individual capacitors are separated from the foil at the end of the major processing steps. This procedure reduces the amount of handling of individual capacitors and eliminates contamination and damage during processing by eliminating the pressing of individual slugs and the use of binders. This procedure is advantageous in that it lends itself to mechanization. However, there are problems involved in the fabrication of powder on foil capacitors as previously described. These problems will be discussed in the following paragraphs.

The separation of individual capacitors from the carrier foil at the end of major processing steps leading to a solid electrolytic capacitor proves to be difficult and a source of damage to otherwise satisfactory units. Cutting of the foil close to the capacitor has to be avoided and, therefore, optimum miniturization cannot be obtained.

The foil containing the metallic powder droplets has to be sintered in a horizontal position because, after drying, the powder without binder will fall off the foil in any other position. The wet powder cannot be introduced to the sintering furnace because the liquid will turn to steam at sintering temperatures to explode the pellets. This limitation also makes handling delicate, especially after the powder has been dried. Also, it limits the loading density of the vacuum sintering furnaces which are usually used. In addition, it has been found that foils of considerable size, especially when preshaped foil is used or when the anodes are large, distort if sintered horizontally supported only by cross bars spaced 1 inch apart.

The present invention has eliminated the above mentioned problems by the addition of a process step and by the use of preformed continuous strips of foil to facilitate separation of individual capacitors and loading in the sintering furnace. The additional step, which will be more fully described in this specification, involves passing the foil through a continuous furnace containing an inert atmosphere after the powder has been deposited in the depressions. The powder is fused and/or bonded to the foil in the continuous furnace. After this step, the foil can be handled freely. For example, a strip of fused and bonded pellets can be wound on a frame and sintered in any position.

Capacitors produced by the method of the present invention are readily distinguishable over prior art powder on foil capacitors because the semiconductor coating and conductive coating completely encloses the sintered pellet and the backing foil portion containing the pellet. In the prior art, the semiconductor coatings and conductive coatings are added to the top of the pellet contained in a depression in the foil. Thus, extra capacitance is obtained by covering the dielectric oxide layer on the back and sides of the capacitor.

Other features and characteristics of the present invention will become apparent as this specification progresses.

It is an object of the present invention therefore, to provide a novel process for manufacturing solid electrolytic capacitors.

It is another object of the present invention to provide a novel process for fabricating solid electrolytic tantalum capacitors.

It is a further object of the present invention to provide a continuous process for fabricating a strip of anodes for solid electrolytic capacitors.

It is an object of the present invention to provide a continuous process for fabricating solid electrolytic capacitors which decreases the amount of handling of individual capacitors during production, eliminates the requirement for a binder and avoids pressing, thereby substantially improving the initial quality of anodes, and reducing damage during processing.

It is an object of the present invention to provide a novel process for manufacturing solid electrolytic tantalum capacitors wherein drops of tantalum powder are sintered onto a strip of tantalum foil and the strip as a whole is processed until the final step wherein the individual capacitors are separated therefrom and packaged.

It is another object of the present invention to provide strip of anodes for solid electrolytic capacitors.

It is still another object of the present invention to provide a strip of spaced apart anodes for solid electrolytic capacitors, said anodes comprising a backing portion of film forming metal having a depression formed therein, a controlled deposit of metallic powder fused to said foil and sintered so as to provide a porous body, and an oxide dielectric coating over said film forming metal and surfaces of said porous body.

It is still another object of the present invention to provide a process for fabricating powder on foil solid electrolytic capacitors wherein said powder is fused to said foil before the sintering operation so as to facilitate handling.

It is a further object of the present invention to provide a strip of metal foil for forming a plurality of anodes for solid electrolytic capacitors, said strip having a plurality of evenly spaced appendages having depressions formed therein for receiving a droplet of powder of the same metal as said foil.

It is still a further object of the present invention to provide a plurality of anodes for solid electrolytic capacitors, said anodes comprising a backing portion of film forming metal, a porous sintered mass of said metal fused thereto, and a dielectric oxide coating formed over said sintered mass and said backing portion, said backing portion being integrally formed with said strip so as to extend therefrom.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which.

Figure 1:
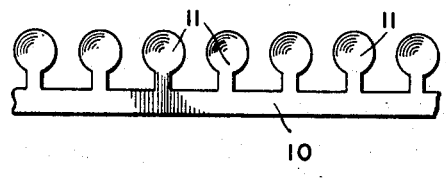
FIGURE 1 shows a single row of foil cups integrally attached to a strip of foil.

Generally speaking, the present invention is a group of unitarily fabricated capacitors. The capacitors are fabricated from a strip of film forming metal having multiple appendages extending therefrom and integrally joined thereto and a mass of said metal fusibly held on the appendages. The appendages are holding members for the masses of said metal. A dielectric oxide coating, semiconductor coating, and conductive coating are deposited over the appendages and masses of metal to form solid electrolytic capacitors. The mass of said metal may be a porous sintered mass obtained by dispensing a controlled deposit of metallic powder in a depression formed in the appendage and by fusing the powder to the depression. After the metallic powder is fused to the appendage it is sintered using standard techniques. There are terminating means attached to said appendage to provide anode connections and to said conductive coatings to provide cathode connections.

Referring now to the drawing, and particularly to FIGURES 1 through 4, several illustrative embodiments of strips of foil cups or depressions can be visualized in conjunction with the following description.

Figure 2:
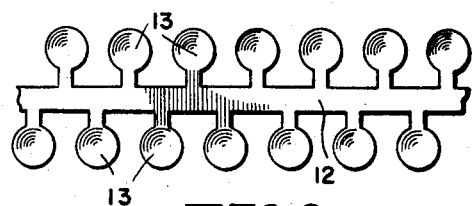
FIGURE 2 shows a row of foil cups on each side of a strip of foil.
Figure 3:
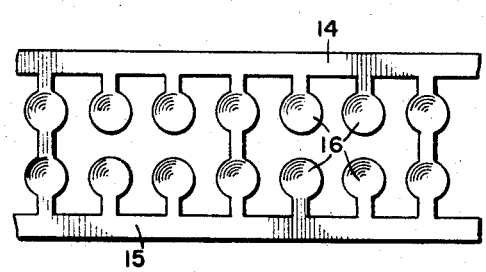
FIGURE 3 shows two rows of foil cups integrally formed with two strips of foil.
Figure 4:
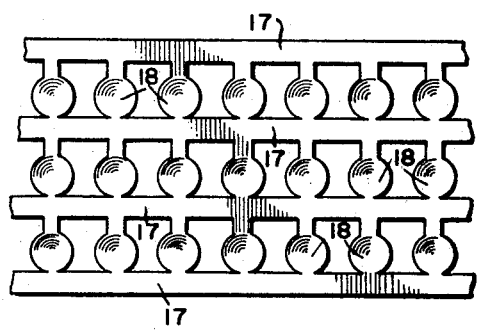
FIGURE 4 shows an array of several rows of foil cups with interconnections required for dimensional stability during processing.

The foil on which droplets of metallic powder are deposited is preshaped according to the outline of the final capacitors. A number of patterns are possible and the most suitable ones have to be selected according to production requirements. For instance, FIGURE 1 illustrates a strip of metal 10 with a row of cups 11 integrally formed thereon. FIGURE 2 illustrates a strip of meal 12 with a row of cups 13 integrally formed on each side thereof. FIGURE 3 illustrates a pair of integrally formed strips 14 and 15 having a plurality of cups 16 formed therebetween. FIGURE 4 illustrates several rows of integrally formed strips 17 and cups 18. Common to all of the approaches shown in FIGURES 1 through 4 is the connection of individual integrally formed foil cups to a strip of metal.

It can be seen in FIGURES 1 through 4 that the cups are so attached to the strips that cutting along straight lines will separate individual rows to strips and will separate individual capacitors. It can also be seen that individual capacitors can be separated by cutting the reduced portion connecting the cups or depressed portions to the strips. Cutting the reduced portion connecting the cups to the strips is considerably easier than cutting around the entire cup as previously described.

For purposes of illustration, it will be assumed that tantalum powder is being deposited onto tantalum foil. Also, and for illustrative purposes, the balance of the disclosed capacitor fabrication processes will also be directed towards the fabrication of solid electrolytic tantalum capacitors.

Figure 5:
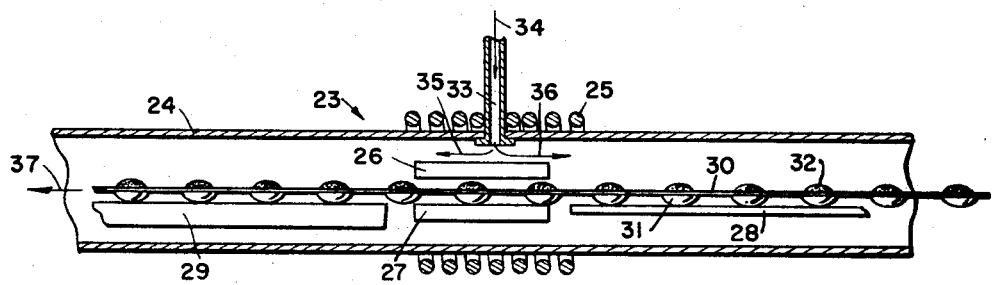
FIGURE 5 is an illustrative embodiment of one type of continuous type furnace which can be used to fuse the powder to the foil.
Figure 6:
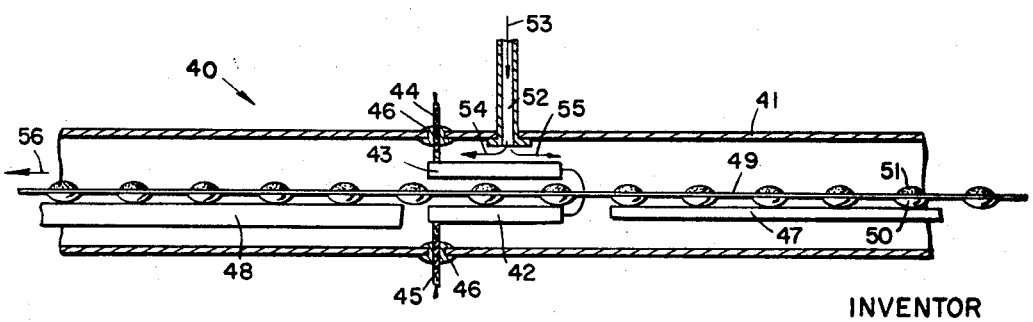
FIGURE 6 is an illustrative embodiment of another type of continuous type furnace which can be used to fuse the powder to the foil.

Tantalum powder is dried and fused onto tantalum foil by passing strips of the foil through a continuous furnace such as the tube type furnaces shown in FIGURES 5 and 6. An inert atmosphere is obtained in the continuous furnaces by bleeding argon or a similar material therein. The temperatures required for the fusing operation vary between 1400° C. and the final sintering temperature of 2000° C. upwards. These high temperatures require the use of materials that will not contaminate the tantalum foil and powder. Suitable methods of heat shielding, cooling, supporting the foil, etc. have to be employed to prevent undesirable side effects. Generally, all components held at high temperatures should be made of tantalum.

The time required for fusing will vary, obviously, according to the temperature employed. Several minutes will be required at lower temperatures while seconds will be sufficient at higher temperatures. It is to be pointed out that this is a pre-sintering process. The purpose of this portion of the process is to secure the tantalum powder to the tantalum foil so that handling is facilitated. A method for continuously sintering tantalum capacitors in an inert atmosphere as contrasted to a vacuum atmosphere will be discussed later in this specification.

If argon is used to obtain an inert atmosphere, it should be of high purity.

Referring to FIGURE 5, an RF induction heated tube furnace 23 for continuously fusing tantalum powder to tantalum foil can be discussed. A fragmentary view of the walls 24 of the furnace 23 is shown in FIGURE 5. RF heater coils 25 are disposed about the walls 24 and are connected to an appropriate power source. Platens 26 and 27 are disposed within the tube walls 24 so as to be in field of the coils 25. The platens 26 and 27 are of high resistivity metal and develop heat because of eddy current losses therein. There is a supporting plate 28 and a cooling plate 29 disposed within the tube walls 24. It can be seen that the supporting plate 28 and cooling plate 29 are disposed so as to direct the strip 30 of cups 31 and powder droplets 32 between the heated platens 26 and 27. There is an entrance port 33 for introducing an inert gas, such as argon. The port 33 is disposed just above the platens 26 and 27 so as to permit the inert gas arriving in the the direction of the arrow 34 to be distributed in the direction of the arrows 35 and 36.

The strip 30 moves in the direction of the arrow 37. The cooling plate 29 is a means for quickly cooling the fused powder droplets 32 before the droplet is subjected to atmospheric conditions.

Referring now to FIGURE 6, a resistance heated continuous furnace 40 for fusing and bonding tantalum powder to tantalum foil can be discussed.

A fragmentary view of the wall 41 of the furnace 40 is shown in FIGURE 6. The wall 41 encloses the resistance heated platens 42 and 43 which are coupled in series and connected to an appropriate power source by the wires 44 and 45. There are feedthrough means 46 in the wall 41 for the wires 44 and 45. There is a supporting plate 47 and cooling plate 48 disposed in the furnace 40. It can be seen that the supporting plate 47 and cooling plate 48 are disposed so as to direct the strip 49 of cups 50 containing powder droplets 51 between the platens 42 and 43.

There is an entrance port 52 for introducing inert gases to the furnace 40. The entrance port is disposed so that inert gas entering in the direction of the arrow 53 is distributed over the platens 42 and 43 in the direction of the arrows 54 and 55.

The strip 49 moves in the direction of the arrow 56.

The tubular wall in the furnaces 23 and 40 may be either tantalum or quartz. The platens 26 and 27 in the furnace 23 and the platens 42 and 43 in the furnace 40 may be tantalum or a suitable material which will not contaminate tantalum.

Figure 7:
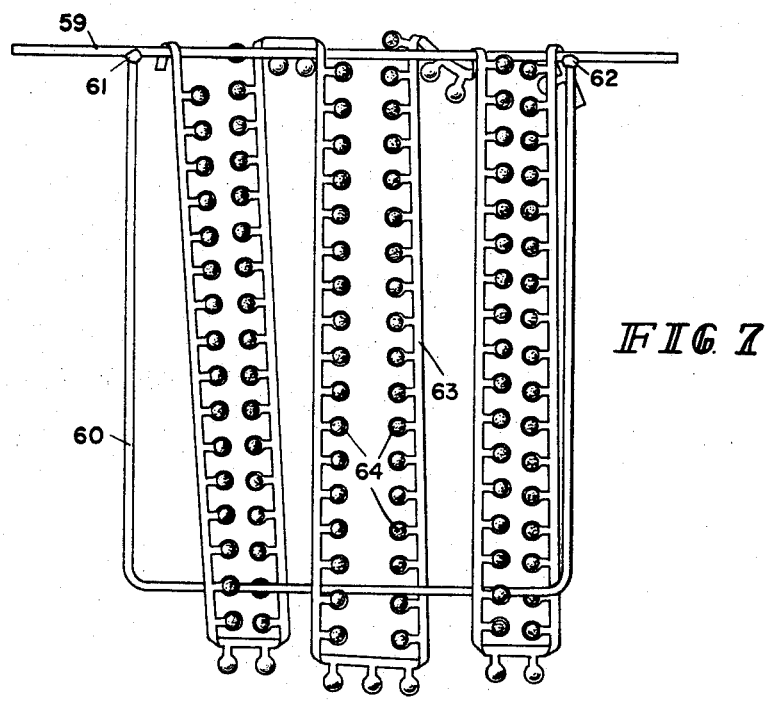
FIGURE 7 is a view illustrating how a strip of foil cups may be wound around a frame so as to facilitate loading in a batch-type sintering furnace.

Referring now to FIGURE 7, a view illustrating how a strip of fused tantalum foil and tantalum powder droplets may be wound around a frame can be discussed.

After the tantalum powder is deposited onto the tantalum foil, and the foil is passed through the continuous furnace as previously described, the tantalum powder is dried and firmly secured to the foil. After the fusing operation, the foil can be twisted, moved, etc. without disturbing the powder. Thus, a strip of foil can be wound around a vacuum furnace frame as shown in FIGURE 7. The vacuum furnace frame consists of the horizontal member 59 and the U-shaped member 60 welded thereto at the weld points 61 and 62.

A strip 63 of tantalum powder pellets 64 may be wound around the frame substantially as shown in FIGURE 7. The frame then can be suspended in a vacuum sintering furnace. The purpose of wrapping the strip 63 around the frame is to facilitate handling and to increase furnace loading.

Figure 8:
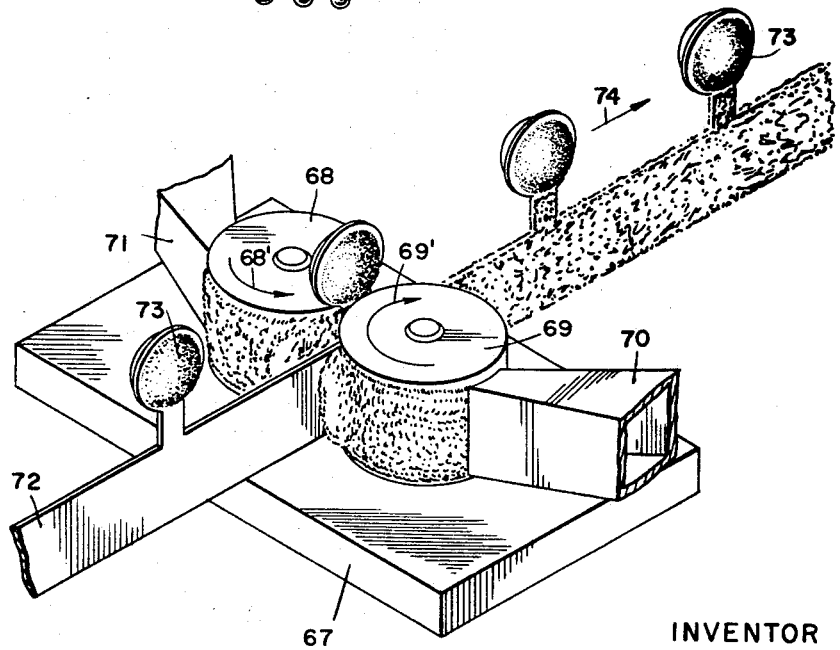
FIGURE 8 is a perspective view of a means for applying masking material to the strip of foil cups.

After the tantalum foil and sintered tantalum pellets are anodized, masking material is applied to the foil in order to limit the area to be covered with a semiconductor material, such as manganese dioxide, and subsequent cathode materials. Referring now to FIGURE 8, a means for applying a masking material, such as silicon rubber or heat resistant varnish, can be discussed.

There is a base 67 which can be fabricated of any suitable structural material. A pair of opposing rollers 68 and 69 are rotatably mounted on the base 67. The roller 68 rotates in the direction of the arrow 68' and the roller 69 rotates in the direction of the arrow 69'. It has been found that suitable rollers 68 and 69 can be made of a hard core, covered with rubber for applying the masking material to the foil. The rollers are slowly driven by a motor means not shown in FIGURE 8.

There are two feeding means 70 and 71 for applying masking material to the rollers 68 and 69 which is, in turn, applied to the strip 72 which has the pellets 73 attached thereto. It can be seen that the masking material is applied to both sides of the strip and the portion connecting each pellet 73. The strip is moved in the direction of the arrow 74 as the masking material is applied. After the masking material is applied, the strips of pellets may be dipped in various solutions for the application of a semiconductor material.

Figure 9:
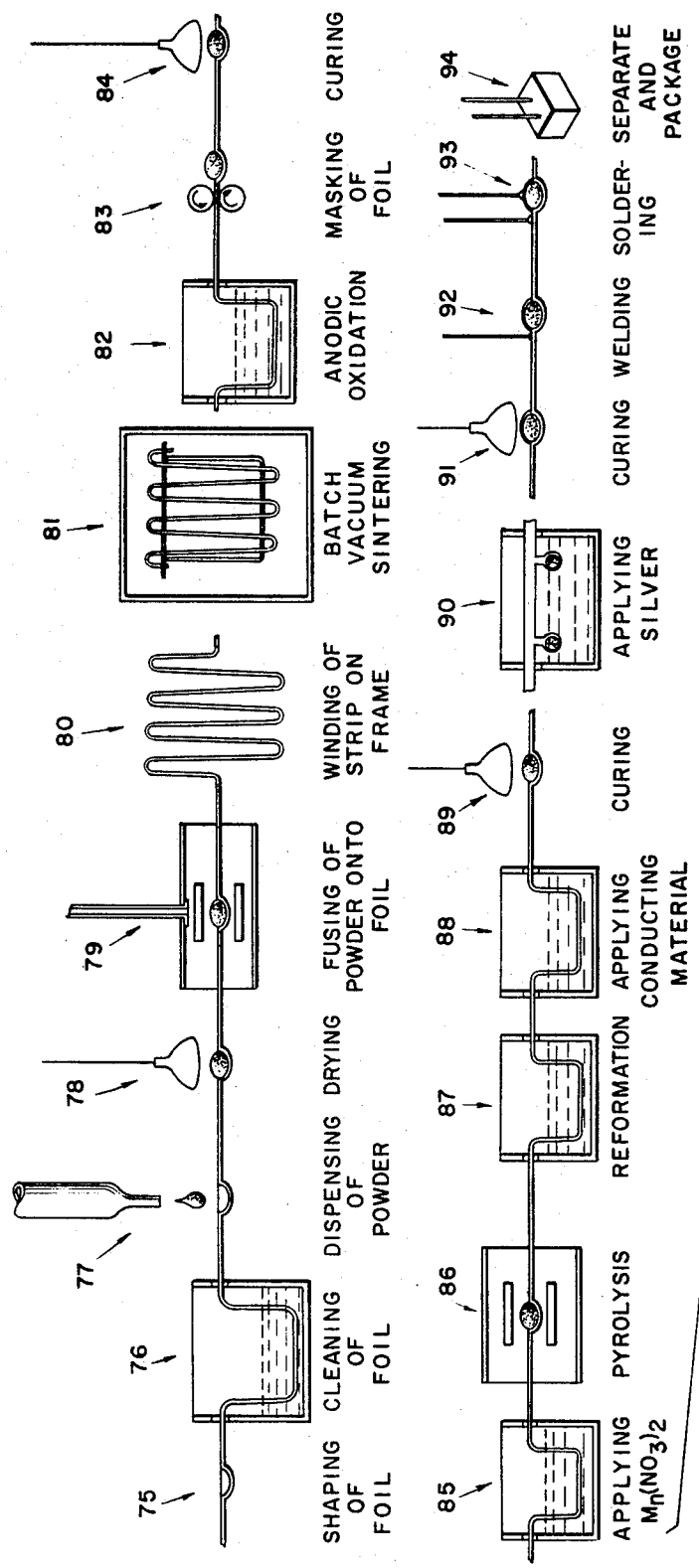
FIGURE 9 is a flow diagram for continuously processing powder on foil capacitors.

Referring now to FIGURE 9, a continuous process flow diagram for producing powder on foil capacitors can be discussed. As stated previously, for illustrative purposes, this flow chart will be directed towards fabricating solid electrolytic tantalum capacitors.

The first step in the continuous process which is designated as 75, consists of shaping the tantalum foil for receiving the powdered tantalum. This step assumes, for illustrative purposes, that the powdered tantalum is deposited in a cup or depression formed in the tantalum foil. As stated previously, the powder may be deposited on flat foil. The cup or depression may be made by any number of thin metal forming techniques, and need not be further discussed in this specification. Tantalum foil, 0.002 inch thick having 0.2 inch diameter cups formed 0.1 inch deep is obviously easy to form. The various configurations of foil strips have been discussed in conjunction with FIGURES 1 through 4.

The next step in the continuous process, designated as 76, involves cleaning the preformed tantalum foil strip to remove oxides, dirt, etc. Cleaning solutions, such as trichlorethylene are adequate for this step of process. Chemical or electrochemical etching of the foil may improve the surface purity of the foil and remove impurities introduced when the foil is preshaped.

The next step, designated as 77, consists of dispensing tantalum powder into the depressions formed in the tantalum foil. It has been found that controlled amounts of tantalum or other metallic powders can be deposited in a carrier liquid. In order to accomplish the dispensing of powder in this manner, a slurry is formed by mixing tantalum powder in liquids such as distilled water, isopropyl alcohol, benzene, toluene, distilled water mixed with glycol, and the like. Liquids are selected on the basis of viscosity, surface tension and ease of removal from the powder. The slurry obtained is placed in a dispensing means such as the dropper shown in FIGURE 9. Control of the drop size is attained by a number of factors. The dense tantalum powder settles to the bottom of the dispensing means and a vibrator means, associated with the dispensing means, is used to assure free and uniform flow of tantalum powder in the capillary tube of the dispensing means. The dropping rate is also controlled by the amount of liquid fed into the dispensing means, the surface tension of the liquid and the material of the tip of the dispensing means.

The dispensing of tantalum powder by the means and methods described above is a simple way for measuring small amounts of powder such as 10–100 mg. amounts.

The next step in the process, designated as 78, consists of drying the droplet of tantalum powder. As shown in the illustrative flow diagram, drying may be accomplished by a heating means such as an infrared lamp.

The next step in the process, designated as 79, consists of fusing the tantalum powder to the tantalum foil. The fusing operation may be carried out in a continuous type furnace such as described in conjunction with FIGURES 5 and 6. The temperatures required in this step vary between 1400° C. and the final sintering temperatures of 2000° C. upwards. Of course, residence time in the continuous furnace will vary according to the temperatures employed. Several minutes will be required at the lower temperatures, while seconds will be sufficient at higher temperatures. It has been found that 1500° C. for 2 minutes is sufficient to fuse droplets approximately 0.25 inch in diameter and 0.1 inch thick. As stated previously, this step of the process, fusing of tantalum powder onto tantalum foil, takes place in an inert atmosphere.

The next two steps in the process, designated as 80 and 81 are illustrated at batch-type operations but may be accomplished continuously if a continuous vacuum furnace is available or if sintering is accomplished in an inert atmosphere. It has been found that by using high purity tantalum foil and high purity powder, sintering accomplished in an argon atmosphere is quite satisfactory. Thus, in one embodiment of this invention, the sintering furnace can be continuous with the fusing furnace previously described or can replace the fusing furnace.

In the batch-type operation, strips of fused tantalum pellets are wound about a frame as described in conjunction with FIGURE 7 and the frame is suspended in a vacuum furnace as depicted in the step designated as 81.

The next step in the process, designated as 82, consists of anodizing the foil and sintered pellet to obtain a dielectric oxide layer. Tantalum film and sintered pellets may be suitably anodized in an electrolyte such as phosphoric acid.

The next step, designated as 83, is the application of a masking material to limit the area of the semiconductor coating. The masking material may be rolled onto the strip as discussed in conjunction with FIGURE 8.

The next step in the process, designated as 84, involves curing the masking material applied in the previous step of the process. As illustrated in FIGURE 9, this step may be accomplished with a heating means such as an infrared lamp.

The next step in the process designated as 85, involves the application of manganese nitrate (Mn (NO$_3$)$_2$) to the anodized pellet. This may be done by dipping as shown in FIGURE 9. The pellets, which are porous tantalum bodies, are impregnated with the manganese nitrate.

The next step, designated as 86, involves pyrolysis of the foil and pellets covered with manganese nitrate to obtain a manganese dioxide coating. The foils and pellets are pyrolyzed at temperatures between 200 and 400° C. following standard procedures.

The next illustrative step in the process, designated as 87, involves the reformation of the oxide coating in any places where it may have been damaged. As illustrated in FIGURE 9, this step, if required, may be accomplished in a typical anodic bath following standard procedures.

The next step in the process, designated as 88, involves the application of a conducting material over the manganese dioxide layer to form a cathode for the capacitor. The conductive coating applied in this step of the process may be graphite which is colloidally suspended in a solution.

The next step in the process, designated as 89, involves curing the conducting coating applied in the previous step. The curing operation requiring approximately 150° C. may be accomplished by a heating means such as an infrared light.

The next step in the process, designated as step 90, consists of applying another conductive coating, such as silver, over the conductive coating previously applied. The silver may be applied by the bath means illustrated in FIGURE 9. It can be seen that the strip moves through the silver bath so that only the pellets and portion of the backing material covered with tantalum oxide and manganese dioxide are covered with silver. The reduced portion of the strip which was previously masked is not covered.

The next step in the process, designated as 91, involves curing the conductive coating applied in the previous step. As shown in FIGURE 9, this curing operation requiring approximately 150° C. may be accomplished with a heating means, such as an infrared lamp.

The next step in the process, designated as 92, consists of welding or otherwise connecting a lead wire to the tantalum foil to provide an anode lead for the capacitor. The lead wire is attached to the tantalum foil in a position removed from the tantalum oxide and manganese oxide coating so as to prevent shorting the anode of the capacitor to the cathode.

The next step in the process consists of soldering or otherwise connecting a lead wire to the conductive coatings applied over the manganese dioxide. The lead wire attached in this step serves as a cathode lead for the capacitor.

The next and final illustrated step in the process involves separating the individual capacitors from the foil strip and packaging the capacitor. The package may be a molded plastic container or a hermetically sealed container. As stated previously, the separation of individual capacitors is accomplished easily by cutting the reduced portion of the strip leading to the pellet.

From the foregoing discussion, it can be seen that the resulting product obtained after the anodic oxidation step, designated as 82 in FIGURE 9, is a strip of metallic foil having a plurality of spaced apart capacitor anodes attached thereto. Each capacitor anode has a backing portion of film forming metal which is an integral appendage of the strip and a porous sintered mass of said metal which is fused thereto. There is a dielectric oxide coating formed on the surfaces of the backing metal and sintered mass. The balance of the processing steps produces a cathode for the capacitor.

The powder on foil capacitor and method of making said capacitor of the present invention, as hereinbefore described in several embodiments, is merely illustrative and not exhaustive in scope. Since many widely different embodiments of the present invention may be made without departing from the scope thereof, it is intended that all matter contained in the above description and shown in the accompanying drawing shall be interposed as illustrative and not in a limiting sense.

What is claimed is:

1. In the manufacturing of electrical capacitors, a method for fabricating anodes suitable for use in said capacitors which comprises the steps of providing a strip of a film-forming metal which has been pre-shaped to have integral appendages extending therefrom and associated each with one of the anodes, depositing moistened powder of said metal on each appendage, fusing the powder thereto in situ at a temperature below the sintering temperature of the film-forming metal to provide a porous mass of said metal bonded to each appendage, and sintering each mass to convert it to a porous pellet of said metal and to integrally join said porous pellet with its associated appendage so that it constitutes together with said appendage the anode for one of said capacitors.

2. The method of claim 1 wherein the fusing of the metal powder to each appendage is carried out in an inert atmosphere.

3. The method of claim 1, wherein said powder and said appendage are tantalum and said liquid is water.

4. The method of claim 3, wherein said moistened powder deposits weight about 10 to about 100 milligrams.

5. A method for unitarily fabricating electrical capacitors as recited in claim 17, further comprising the steps of
anodizing each appendage and pellet associated therewith of the anodes to form a dielectric oxide coating of said metal on the surfaces of each appendage and pellet,
applying a separate cathode layer over each pellet and the portions of its associated appendage which are adjacent said pellet,
attaching a connector lead to each cathode layer, and
attaching a connector lead to each appendage at a location remote from the cathode layer associated therewith.

6. The method of claim 5, wherein said moistened powder consists essentially of a metal selected from the group consisting of tantalum, aluminum, niobium, zirconium or titanium and a liquid selected from the group consisting of water, isopropyl alcohol, benzene, toluene and water with glycol.

7. The method of claim 5 which further comprises applying an electrically non-conductive masking material to the surfaces of said strip and to the surfaces of each appendage between its juncture with the strip and the porous pellet joined thereto after anodizing same but before applying the cathode layer thereto.

8. The method of claim 5 which further comprises separating each appendage from the strip at the juncture of the two after attaching the connector leads to it and the cathode layer associated therewith.

9. The method of claim 8, wherein said steps of said method are performed as substantially continuous steps.

10. The method of claim 8, wherein separation of said appendage from said strip is accomplished whereby said appendage includes a reduced portion to which at least one of said leads is attached.

11. In a method for fabricating structures suitable for use as anodes for capacitors including the steps of providing a strip of film-forming metal having integral appendages extending therefrom, depositing moistened film-forming metal powder on each of said metal appendages, and sintering said powder to form a porous mass of metal and to bond the masses to said appendages respectively, each porous mass and appendage together providing said anode for one of said capacitors, the improvement comprising
prior to sintering, fusing said powder to said appendages at a temperature below the sintering temperature of said film-forming metal to provide a porous mass of said powder bonded to each appendage.

12. The method of claim 11, wherein said fusing is carried out in an inert atmosphere.

13. The method of claim 11, wherein said fusing is conducted at a temperature of about 1400° C. to about 1800° C. for a few seconds to about 5 minutes.

14. The method of claim 11, wherein said steps of depositing said moistened film-forming metal powder on said appendages and fusing said powder to said appendages and sintering said powder are substantially continuous steps.

References Cited
UNITED STATES PATENTS

| | | | |
|---|---|---|---|
| 2,406,345 | 8/1946 | Brennan | 317—230 |
| 2,478,856 | 8/1949 | Beaver | 75—222 |
| 2,733,389 | 1/1956 | Ellison | 317—230 |
| 2,743,400 | 4/1956 | Bujan | 317—230 |
| 3,004,332 | 10/1961 | Werner | 317—230 |
| 3,144,328 | 7/1964 | Doty | 75—200 |

JAMES D. KALLAM, *Primary Examiner.*

UNITED STATES PATENT OFFICE
CERTIFICATE OF CORRECTION

Patent No. 3,412,444                                                   November 26, 1968

Gerhart P. Klein

It is certified that error appears in the above identified patent and that said Letters Patent are hereby corrected as shown below:

Column 9, line 9, the claim reference numeral "17" should read -- 1 --.

Signed and sealed this 17th day of March 1970.

(SEAL)
Attest:

Edward M. Fletcher, Jr.                                WILLIAM E. SCHUYLER, JR.
Attesting Officer                                                Commissioner of Patents